United States Patent [19]

Sherman

[11] Patent Number: 5,025,408
[45] Date of Patent: Jun. 18, 1991

[54] BIT SERIAL MULTIPLIER WITH PARALLEL-IN-SERIAL-OUT CARRY AND PARTIAL PRODUCT SHIFT REGISTERS

[75] Inventor: David L. Sherman, Fremont, Calif.

[73] Assignee: Shographics, Inc., Mountain View, Calif.

[21] Appl. No.: 387,601

[22] Filed: Jul. 31, 1989

[51] Int. Cl.⁵ .............................................. G06F 7/52
[52] U.S. Cl. .................................... 364/759; 364/754
[58] Field of Search ................. 364/754, 757, 759-760

[56] References Cited

U.S. PATENT DOCUMENTS

| | | | |
|---|---|---|---|
| 3,610,907 | 10/1971 | Taylor | 364/759 |
| 3,617,723 | 11/1971 | Melvin | 364/759 |
| 3,816,732 | 6/1974 | Jackson | 364/759 |
| 3,878,985 | 4/1975 | Ghest et al. | 364/759 |

*Primary Examiner*—Dale M. Shaw
*Assistant Examiner*—Tan V. Mai
*Attorney, Agent, or Firm*—Ronald C. Fish

[57] ABSTRACT

A bit serial multiplier suitable for pipelined operations. This multiplier uses a conventional bit serial multiplier cell using Booth's algorithm and stored carry architecture, but modified in several respects. First, the partial product and carry storage registers may be put in a hold state so that their contents remain constant over as many clock cycles as a stall signal is asserted so that data may be inserted in the pipeline without destroying pipeline synchronization. Second, there are added two shift registers one of which parallel loads the partial product bits and the other of which loads the carry bits as each set of bits exists after all the multiplier bits have been shifted into the multiplier. After the parallel loading process, the partial product and carry latches in the main cell are cleared thereby allowing another multiplication with different operands to begin. While this second multiplication is being performed, the partial product and carry bits from the first multiplication are being shifted out of the shift registers to an adder which combines these bits to derive the final product bits. Multiple multiplicand storage registers are provided for allowing prefetch and rapid change of operands and multiple multiplier bit stream control circuitry is provied.

8 Claims, 8 Drawing Sheets

$$C_{m,n} = (X_m \cdot (CY_n \oplus Y_{n-1}) \oplus C_{m,n-1})) \cdot (S_{m+1,n-1} \oplus Y_n)$$
$$= ((X_m \cdot (Y_n \oplus Y_{n-1})) \oplus C_{m,n-1}) \cdot (S_{m+1,n-1} \oplus Y_n)$$
$$S_{m,n} = S_{m+1,n-1} \oplus C_{m,n-1} \oplus (X_m \cdot (Y_n \oplus Y_{n-1}))$$

WHERE $X_m$ IS A MULTIPLICAND BIT
$Y_n$ IS A MULTIPLIER BIT
$Y_{n-1}$ IS THE PREVIOUS MULTIPLIER BIT
$m$ IS THE CELL POSITION OF THE $m^{TH}$ MULTIPLICAND BIT OF X
$n$ IS THE TIME OF ARRIVAL OF THE $n^{TH}$ MULTIPLIER BIT OF Y
$S_{m,n}$ IS A SUM BIT AT POSITION $m$, TIME $n$
$C_{m,n}$ IS A CARRY BIT AT POSITION $m$, TIME $n$
$S_{m+1,n-1}$ IS SUM BIT FROM POSITION $m+1$, FROM PREVIOUS TIME CYCLE $n-1$
$C_{m,n-1}$ IS A CARRY BIT AT POSITION $m$, FROM PREVIOUS TIME CYCLE $n-1$

AND $\oplus$ = THE EXCLUSIVE-OR LOGICAL OPERATION
$\cdot$ = THE AND LOGICAL OPERATION

FIG. 3

| $Y_n$ | $Y_{n-1}$ | OPERATION | BOOTH'S ALGORITM HARDWARE COMMAND |
|---|---|---|---|
| 0 | 0 | $\pi_n = 1/2\, \pi_{n-1}$ | NO CHANGE, SHIFT |
| 1 | 0 | $\pi_n = 1/2\, (\pi_{n-1} - X)$ | SUBTRACT, SHIFT |
| 1 | 1 | $\pi_n = 1/2\, \pi_{n-1}$ | NO CHANGE, SHIFT |
| 0 | 1 | $\pi_n = 1/2\, (\pi_{n-1} + X)$ | ADD, SHIFT |

$\pi_n$ = PARTIAL PRODUCT AT BIT TIME $n$
$\pi_{n-1}$ = PREVIOUS BIT TIME PARTIAL PRODUCT

FIG. 5

| $Y_n$ | $Y_{n-1}$ | PREVIOUS ARITHMETIC OPERATION | SIGN OF CURRENT $C_{m,n-1}$ | REQUIRED OPERATION | SIGN OF NEW $C_{m,n}$ |
|---|---|---|---|---|---|
| 0 | 0 | ADDITION | + | $\pi_{m,n} = S_{m+1,n-1} + C_{m,n-1}$ | + |
| 1 | 0 | ADDITION | + | $\pi_{m,n} = S_{m+1,n-1} - X_m + C_{m,n-1}$ | − |
| 1 | 1 | SUBTRACTION | − | $\pi_{m,n} = S_{m+1,n-1} + C_{m,n-1}$ | − |
| 0 | 1 | SUBTRACTION | − | $\pi_{m,n} = S_{m+1,n-1} + X_m + C_{m,n-1}$ | + |

FIG. 6

| STATE | $X_m$ | $Y_n$ | $Y_{n-1}$ | $S_{m+1,n-1}$ | $C_{m,n-1}$ | $S_{m,n}$ | $C_{m,n}$ |
|---|---|---|---|---|---|---|---|
| 0 | 0 | 0 | 0 | 0 | 0 | 0 | 0 |
| 1 | 0 | 0 | 0 | 0 | 1 | 1 | 1 |
| 2 | 0 | 0 | 0 | 1 | 0 | 1 | 0 |
| 3 | 0 | 0 | 0 | 1 | 1 | 1 | 1 |
| 4 | 0 | 0 | 1 | 0 | 0 | 0 | 0 |
| 5 | 0 | 0 | 1 | 0 | 1 | 1 | 1 |
| 6 | 0 | 0 | 1 | 1 | 0 | 1 | 0 |
| 7 | 0 | 0 | 1 | 1 | 1 | 1 | 1 |
| 8 | 0 | 1 | 0 | 0 | 0 | 0 | 0 |
| 9 | 0 | 1 | 0 | 0 | 1 | 1 | 1 |
| 10 | 0 | 1 | 0 | 1 | 0 | 1 | 0 |
| 11 | 0 | 1 | 0 | 1 | 1 | 1 | 1 |
| 12 | 0 | 1 | 1 | 0 | 0 | 0 | 0 |
| 13 | 0 | 1 | 1 | 0 | 1 | 1 | 1 |
| 14 | 0 | 1 | 1 | 1 | 0 | 1 | 0 |
| 15 | 0 | 1 | 1 | 1 | 1 | 1 | 1 |
| 16 | 1 | 0 | 0 | 0 | 0 | 0 | 0 |
| 17 | 1 | 0 | 0 | 0 | 1 | 1 | 0 |
| 18 | 1 | 0 | 0 | 1 | 0 | 1 | 0 |
| 19 | 1 | 0 | 0 | 1 | 1 | 0 | 1 |
| 20 | 1 | 0 | 1 | 0 | 0 | 1 | 0 |
| 21 | 1 | 0 | 1 | 0 | 1 | 0 | 0 |
| 22 | 1 | 0 | 1 | 1 | 0 | 0 | 1 |
| 23 | 1 | 0 | 1 | 1 | 1 | 1 | 0 |
| 24 | 1 | 1 | 0 | 0 | 0 | 1 | 0 |
| 25 | 1 | 1 | 0 | 0 | 1 | 0 | 0 |
| 26 | 1 | 1 | 0 | 1 | 0 | 0 | 0 |
| 27 | 1 | 1 | 0 | 1 | 1 | 0 | 0 |
| 28 | 1 | 1 | 1 | 0 | 0 | 0 | 0 |
| 29 | 1 | 1 | 1 | 0 | 1 | 1 | 1 |
| 30 | 1 | 1 | 1 | 1 | 0 | 1 | 0 |
| 31 | 1 | 1 | 1 | 1 | 1 | 0 | 0 |

BIT SERIAL MULTIPLIER WITH PARALLEL-IN-SERIAL-OUT CARRY AND PARTIAL PRODUCT SHIFT REGISTERS

BACKGROUND OF THE INVENTION

The invention pertains to the field of bit serial multipliers, and, more particularly, to the field of bit serial multipliers of improved throughput. Such improved multipliers utilize parallel load shift registers to store each of the partial product bits and carry bits from a first multiplication to free the multiplier to begin a new multiplication while the carry bits and partial product bits from the previous multiplication are being combined to arrive at the final result.

Bit serial multipliers are known. Such multipliers load a multiplicand in parallel into a plurality of adder cells with one bit in each cell. A multiplier is then shifted into the machine one bit at a time. Each multiplier bit is used to multiply the multiplicand to generate a partial product. Each partial product is shifted to the proper position to be added with the next partial product generated from the next multiplier bit. Each such addition can generate carries at one or more bit positions. These carries must be propagated to the proper bit position, i.e., the next bit position to the left, for use in the partial product addition operation.

Carry propagation takes valuable time so a variation called a stored carry machine was developed. In a stored carry machine, the fact that the partial product bits are shifted right by one place for each new multiplier bit in preparation for the next partial products addition is used to advantage. In such machines, instead of shifting the carry bit from each stage to the left for use in the partial product addition being performed by the cell on the left, the carry bit is stored for one multiplier bit cycle time in the cell in which the carry was generated. When the partial product bit arrives from the cell on the left for the next partial product addition, the carry bit is input to the full adder of the same cell in which the carry was generated for use in the addition. This storage of the carry for one cycle time while the partial product is shifted right by one bit position has the effect of a left shift by one bit position of the carries generated in each cell.

Another variation to operations by bit serial multipliers is called the Booth algorithm. This algorithm is well known and involves looking at both the current multiplier bit and the previous bit and then performing one of four operations depending upon the logic state of the current and previous multiplier bits. These operations are given in Table I below:

TABLE I

| $Y_n$ | $Y_{n-1}$ | Function |
| --- | --- | --- |
| 0 | 0 | No arithmetic operation. Shift partial product relative to multiplier. |
| 0 | 1 | Add multiplicand to partial product, S, and shift new partial product one place to the right relative to the multiplier. |
| 1 | 0 | Subtract multiplicand from partial product, S, and shift new partial product. |
| 1 | 1 | No arithmetic operation (perform correction by executing both add and subtract. Shift partial product relative to multiplier. |

As used in Table I and elsewhere herein $Y_n$ is the current multiplier bit, and $Y_n-1$ is the previous multiplier bit.

The Am25LS14 Serial/Parallel Multiplier manufactured by Advanced Micro Devices of Sunnyvale, Calif. is one example of such a bit serial multiplier with stored carry and using Booth's algorithm. This device is described in great detail in an application note called "Mechanization of the Am25LS14 Serial/Parallel Multiplier" by John R. Mick which is hereby incorporated by reference.

One problem with the genre of bit serial multipliers represented by the AMD AM25LS14 is that for an N bit multiplier, it takes 2N clock cycles to get all the bits of the final result shifted out of the machine. Each multiplier bit is shifted in during the first N clock cycles, and all the partial products and all the carries at each bit position are generated. The least significant N bits of the final product are shifted out during the first N clock cycles. However, the most significant bits of the final product are still in the machine stored as the partial product bits and the carries in the individual cells of the multiplier. The next N clock cycles must be consumed shifting out the partial product bits and the carries and combining them to derive the most significant final product bits. During these second N clock cycles, the multiplier cells are essentially idle being occupied only with the process of shifting and combining the partial product and carry bits. This is an inefficient use of the multiplier. Accordingly, a need has arisen for a way to increase the throughput of bit serial multipliers.

SUMMARY OF THE INVENTION

According to the teachings of the invention, there is disclosed herein an apparatus and method for doubling the throughput of a bit serial multiplier. To each cell of a conventional bit serial multiplier there is added a pair of flip flops or other memory devices and a pair of multiplexers. The flip flops are coupled together with the corresponding flip flops in other cells to serve as two parallel load, serial output shift registers. One such shift register serves to store the most significant bits of partial product during the second N clock cycles. The other shift register serves to store the most significant carry bits during the second N clock cycles. One multiplexer in each cell is coupled, in a first state, to allow the partial product bit from the cell to be coupled into the corresponding flip flop in the partial product shift register. In a second state, the multiplexer is coupled to allow the partial product bit from the preceding partial product shift register stage to be clocked into the flip flop in the partial product shift register of the cell. The second multiplexer is coupled similarly to the first multiplexer, but, instead of switching the source of partial product bits, it switches the source of the carries that are clocked into the carry shift register flip flop in the cell. The source of the carries is switched between the carry storage flip flop in the conventional cell and the previous stage of the carry storage shift register.

Operation of the system is identical to the known operation of conventional bit serial multipliers during the first N clock cycles. However, at the end of the first N clock cycles, the partial product bits from the conventional portion of the multiplier cells are loaded in parallel into the flip flops comprising the partial product shift register. Likewise, at the end of the first N clock cycles, the carries stored in the carry storage flip flops of the conventional portion of the cell are loaded in parallel into the carry shift register. All the flip flops in the conventional portion of the multiplier cells are then cleared. This frees the conventional portion of the multiplier cells to load another multiplicand and to begin shifting in the bits of the next multiplier. This second multiplication operation takes place during the first N clock cycles for the second multiplication which correspond to the second N clock cycles for the first multiplication. The parallel loading of the partial product bits and the carry bits is accomplished by causing the multiplexers to shift to their states coupling the shift register flip flops to their sources of partial product and carry bits for one clock cycle. Thus, on the Nth plus 1 clock cycle, the partial product bits and carry bits from each cell are simultaneously clocked into the corresponding flip flop in the partial product shift register and the carry shift register, respectively.

During the second N clock cycles, while the least significant bits of the second multiplication final result are being developed and shifted out of the conventional portion of each cell, the most significant bits of the final product from the first multiplication are calculated. This process occurs by shifting the partial product and carry bits in the partial product and carry shift registers out to a final stage adder. As each partial product bit and a carry bit, if any, emerges from the two shift registers, they are combined in a full adder coupled to the outputs of the shift registers. The output of the full adder is the most significant bits of the final result from the first multiplication. Simultaneously, the least significant bits of the final result of the second multiplication are emerging from the conventional output of the last cell in the multiplier.

DETAILED DESCRIPTION OF THE PREFERRED EMBODIMENT

Figure 1:
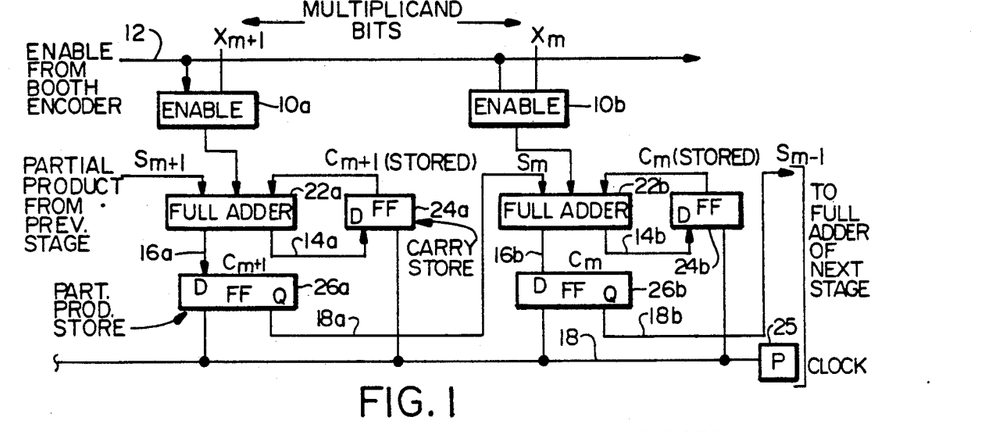
FIG. 1 is a block diagram of two consecutive cells of a conventional bit serial multiplier using Booth's algorithm and a stored carry architecture.

Referring to FIG. 1, there is shown a block diagram of two consecutive cells of a conventional bit serial multiplier using Booth's algorithm and a stored carry architecture. A brief description of the operation of this device will be given for completeness. Each cell of the multiplier receives one bit of the multiplicand. In the case of the two cells shown in FIG. 1, these multiplicand bits are $X_{m+1}$ and $X_m$ respectively. Each of these multiplicand bits is applied, respectively, through an enable gate, 10a and 10b, to an input of a full adder, 22a and 22b, of the corresponding cell. The enable gates serve to block or to allow application of the multiplicand bits to the full adder inputs depending upon the logic state of an enable signal on a line 12. Line 12 is coupled to the output of a Booth encoder (not shown) which has as its inputs the current multiplier bit and the previous multiplier bit. The Booth encoder performs an exclusive-or logical operation between the current and the previous multiplier bit and outputs the result on the line 12. If either of the second or third states in Table I above exists, line 12 is a logic 1, and the multiplicand bits are applied to the full adders.

Each full adder also receives as an input the partial product bit from the next higher stage on the left. For cell a, i.e., the cell with full adder 22a, the incoming partial product bit is the signal $S_{m+1}$. For cell b, the incoming partial product bit is $S_m$.

Each full adder also has as an input the stored carry bit from the previous bit time. For cell a, this carry bit is the signal $C_{m+1}$, and for cell b, this carry is the signal $C_m$. In cell a, this carry is stored in the flip flop 24a, and in cell b, this carry is stored in flip flop 24b. Each of these flip flops has its D input coupled via lines 14a and 14b, respectively, to the carry out outputs of the full adders 22a and 22b, respectively. The clock inputs of these flip flops are coupled to the clock line 18 which carries clock pulses from a clock or pulser 25. Thus as each bit of the multiplier is decoded in the Booth decoder and the partial product bits are added to either the multiplicand or zero, carries are sometimes generated on the lines 14 of each cell. On the next clock pulse, as the new multiplier bit is clocked in, and decoded, the carries or lack of carries on the lines 14 are clocked into the flip flops 24 in each cell and appear on the carry signal line in each cell coupled to an input of the full adder for combining with the partial product bit from the next stage to the left. The partial product bits are stored in the a and b cells in the flip flops 26a and 26b, respectively, which have their D inputs coupled via lines 16a and 16b, respectively, to the adder output of the full adders 22a and 22b, respectively. The clock input of each of these flip flops is coupled to the clock line 18 such that as each full adder presents its result from processing the current multiplier bit on the line 16 for that cell, the partial product bit is clocked into the corresponding one of the flip flops 26. These partial product bits then appear at the Q outputs of the flip flops 26, e.g., lines 18a and 18b for cells a and b, each of which is coupled to an input of the full adder in the next cell to the right.

Figure 2:
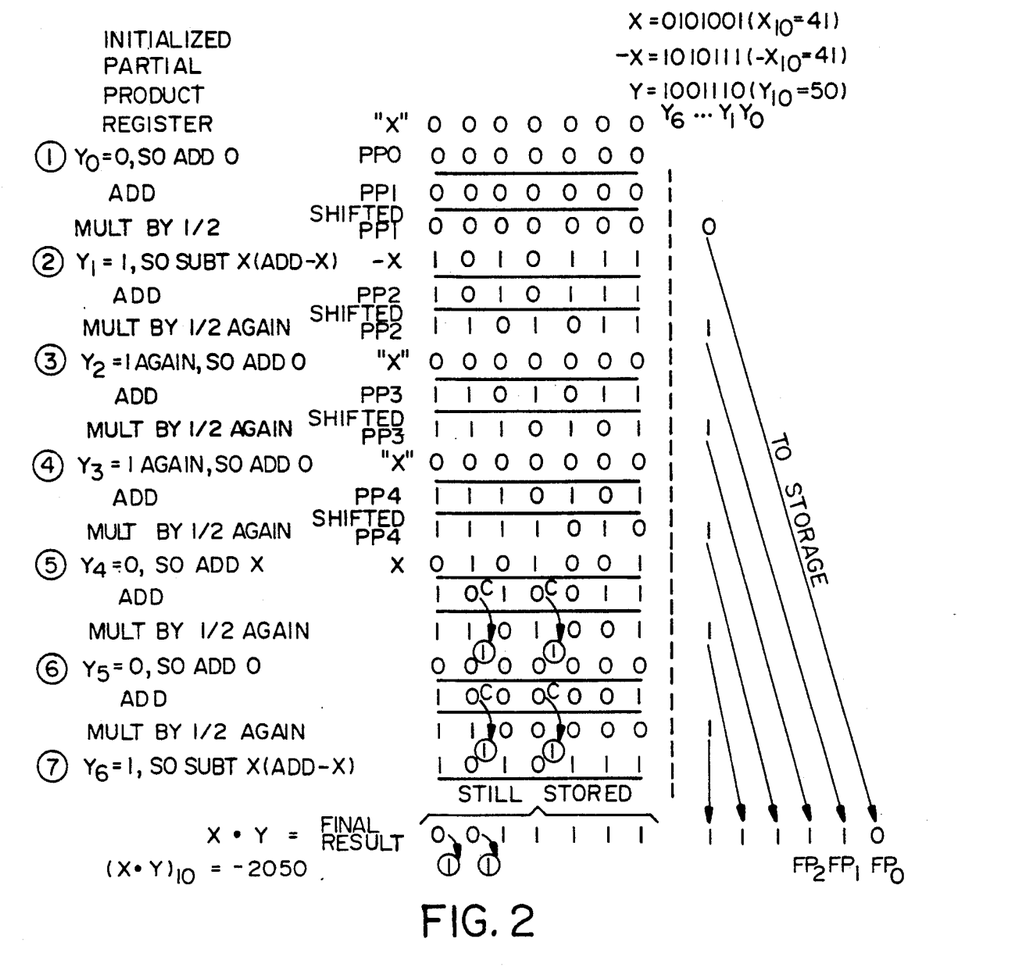
FIG. 2 is a diagram of a sample multiplication using Booth's algorithm.

The manner in which the partial product bits are generated and shifted is best understood by reference to FIG. 2 which shows an exemplary sequence of operations in a Booth algorithm multiplication of a multiplicand $X = 0101001$ (4110) by a multiplier $Y = 1001110$ (5010). Since the Booth algorithm calls for subtraction in some cases, the two's complement of the multiplicand must be available since addition of the two's complement of the multiplicand to the partial product is equivalent to subtracting the multiplicand from the partial product. The two's complement of X is derived by complementing each bit and adding one or $-X = 1010111$.

Since Y is 7 bits long, 7 clock cycles are needed to process all the multiplier bits of Y. The events of each of these first 7 clock cycles are labelled by the numbers 1 through 7 in FIG. 2. During the first clock cycle, the first multiplier bit Y0 is shifted in and it is a 0. There is no previous multiplier bit, so no mathematical operation occurs, only a shift to the right. In FIG. 2 this is represented by the add 0 operation where the enable gates 10 block the multiplicand bits from being applied to the inputs of the full adder so an effective all 0 multiplicand is added to the partial product bits stored in the flip flops 26. The flip flops 26 and 24 are cleared at the start of each new multiplication. After the all zero partial product PP1 is derived, a right shift is implemented during the second clock cycle by virtue of the partial product bits of PP1 being clocked into the flip flops 26 of each cell and the outputs of these flip flops being coupled to the next cell to the right. This is equivalent to multiplying the partial product by ½ or dividing it by 2. The least significant bit of the final product FP0 emerges from the Q output of the flip flop 26 in the last cell to the right in the multiplier. This bit is shifted into storage (not shown) to await accumulation of the balance of the final product bits.

During the second clock cycle, the second multiplier bit Y1 is shifted in, and it is a 1. Since the previous multiplier bit was a 0, the Booth algorithm rule is to subtract the multiplicand from the partial product. This is done by adding the two's complement of the multiplicand ($-X$) to the partial product bits at the inputs to the full adders. The result is partial product PP3 which is then right shifted by one place upon the next clock pulse leaving the state of the flip flops as shown on the "shifted PP2" line of FIG. 2. The next least significant bit FP1 of the partial product is then available at the Q output of the flip flop 26 of the rightmost cell.

During the third clock cycle, the third multiplier bit, Y2, is decoded by the Booth decoder. Since Y2 is a 1 and Y1 was a 1, the Booth rule is to add 0 and shift. The enable gates 10 are then blocked, so the multiplicand bits do not appear at the inputs of the full adders. This string of zeroes is added to "shifted PP1" to yield the partial product PP3 which is then shifted and sign extended to give "shifted PP3". This makes the third least significant bit of the final product FP2 available at the output of the rightmost cell.

This process is repeated for Y3 to derive PP4 and "shifted PP4". During the 4th clock cycle, Y4 arrives and is a 0 whereas Y3 was a 0. The Booth rule in this circumstance is to add the multiplicand to the partial product. This results in some carries in certain bit positions. These carries are stored in the flip flops 24 of the cells in which they are generated and they affect the mathematical operation carried out during the next cycle. These carries and their delayed effect are shown in FIG. 2 by the circled 1's at the bit times when Y5 and Y6 arrive.

At the end of the first 7 clock cycles, the first 6 bits of the final result have been shifted out and the flip flops 26a store the remaining bits given in FIG. 2 on the "final result" line. The flip flops 24a store the carry bits which are circled just below the final result line.

Figure 3:
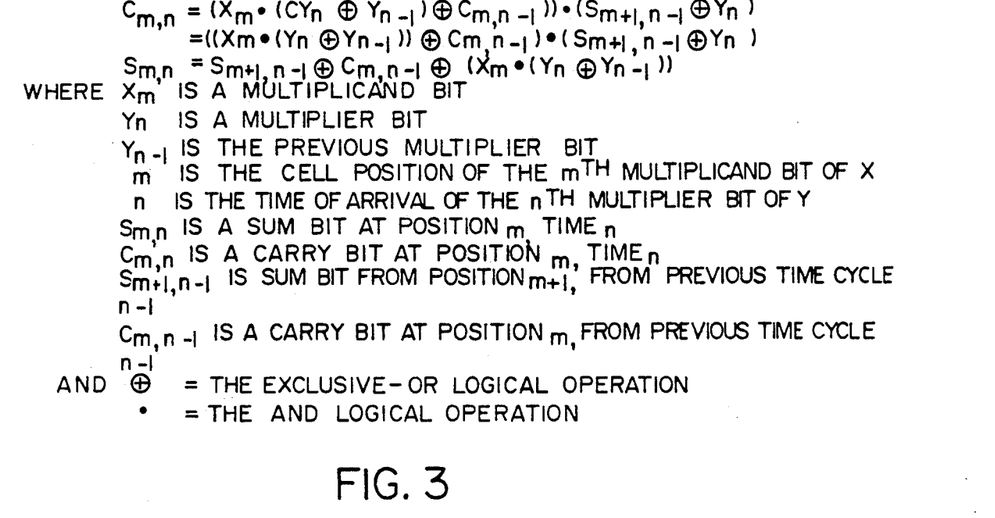
FIG. 3 gives the Boolean Algebra equations for the Booth algorithm.
Figure 4:
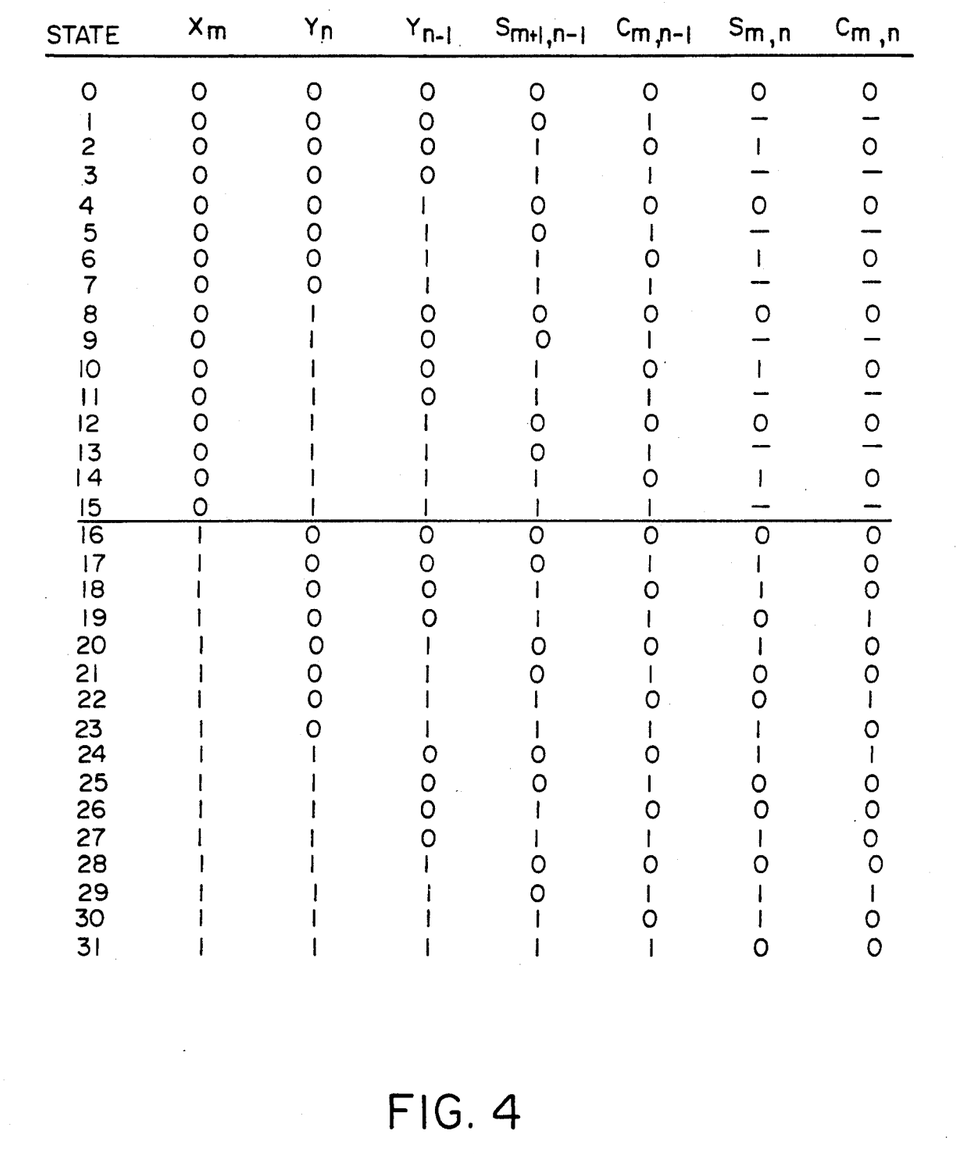
FIG. 4 gives the truth table for the Booth algorithm.
Figure 5:
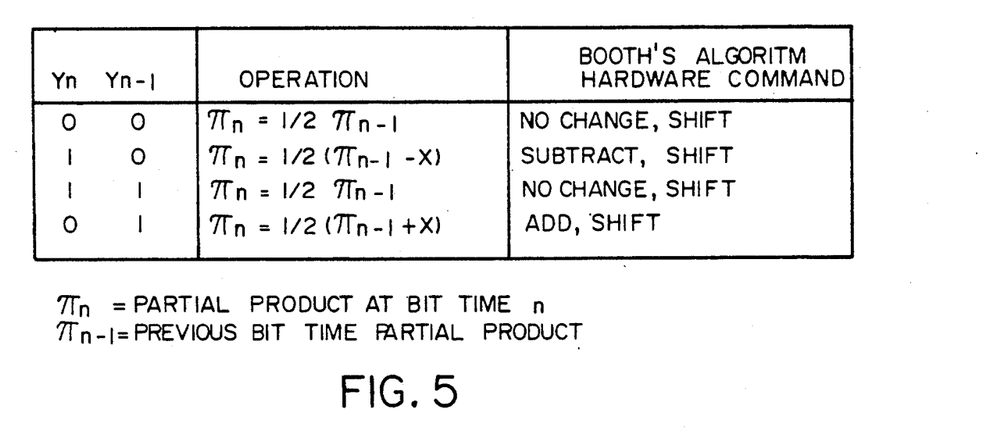
FIGS. 5 and 6 are tables which aid the reader in interpreting the required operations for handling the partial product, the multiplicand and the carry bits for each state of the present and previous multiplier bits to aid in interpreting the equations of FIG. 3.
Figure 6:
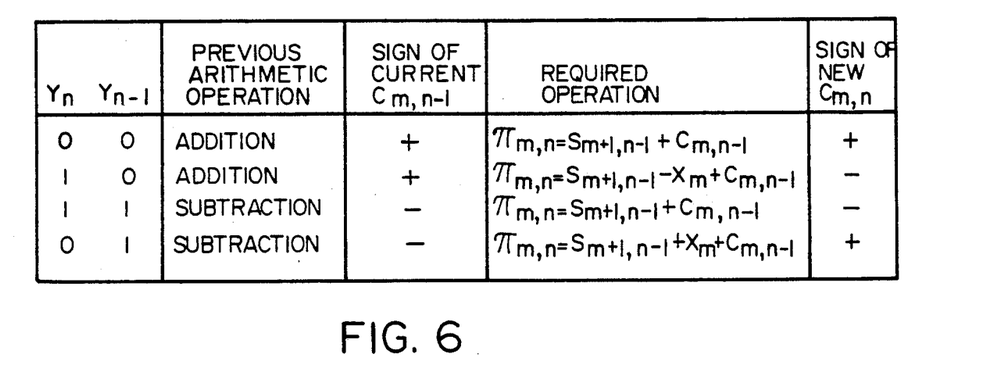

The operations of a Booth algorithm bit serial multiplier in generating the carry and partial product bits can be described mathematically in a truth table and two Boolean algebra equations. The Boolean equations are given in FIG. 3, and the truth table is given in FIG. 4. FIGS. 5 and 6 are tables which aid the reader in interpreting the required operations for handling the partial product, the multiplicand and the carry bits for each state of the present and previous multiplier bits to aid in interpreting the equations of FIG. 3. Those skilled in the art will appreciate that FIGS. 3 through 6 completely mathematically and logically define a bit serial multiplier using stored carry and Booth's algorithm. as shown in the block diagram of FIG. 1. Any detailed logic implementation that implements the mathematical equations of FIG. 3 and the truth table of FIG. 4 will suffice for purposes of practicing the invention. Further, the invention may also be practiced with other stored carry bit serial multipliers not using Booth's algorithm.

The teachings of the invention include the manner in which these "still stored" partial product and carry bits on the final result line are loaded into a pair of parallel load serial out shift registers and how they are shifted out and combined while the multiplier is cleared to put it into a condition to handle the next multiplication.

Figure 7:
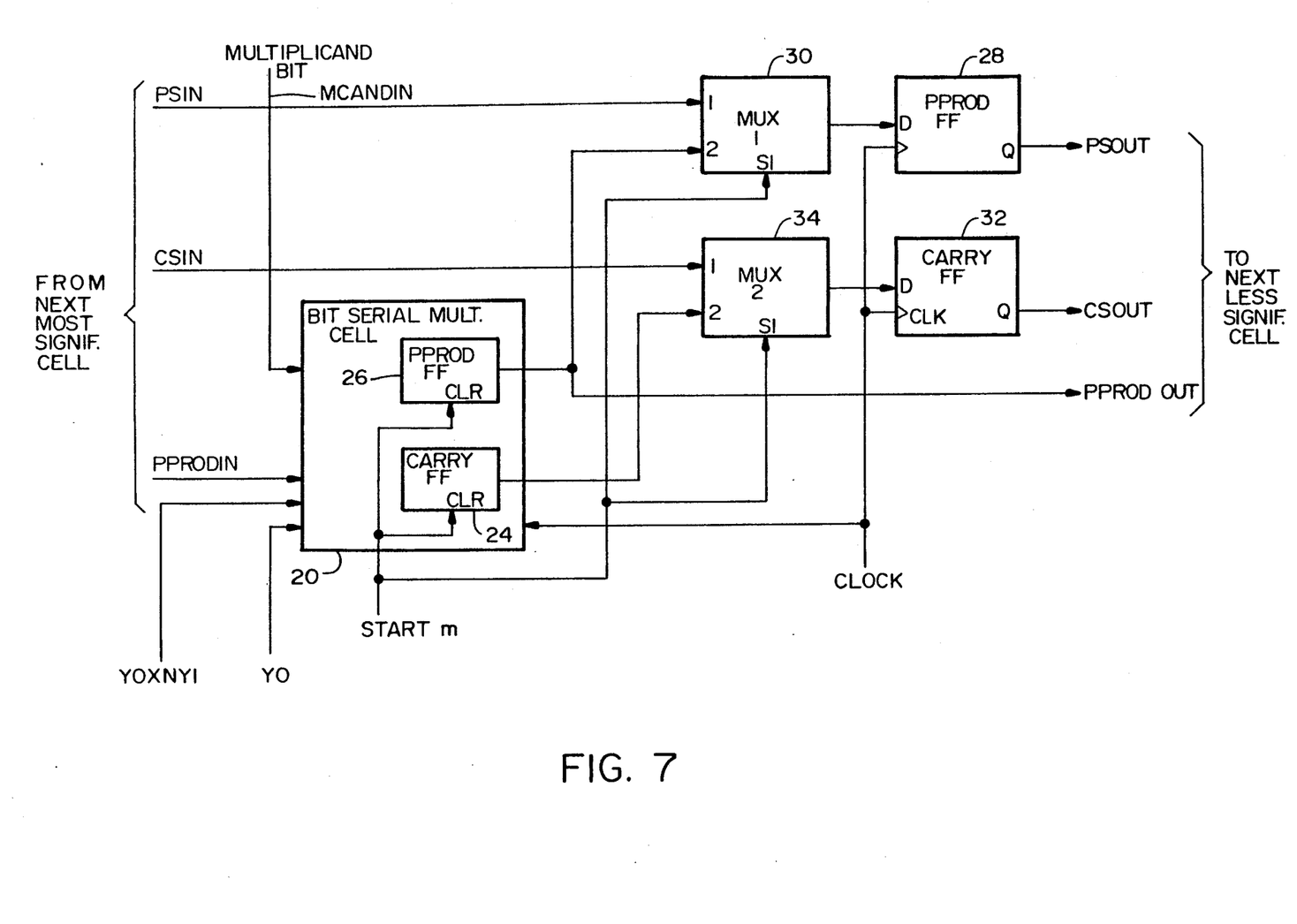
FIG. 7 is a block diagram of the architecture for a bit serial multiplier according to the teachings of the invention.

FIG. 7 is a block diagram of the architecture for a bit serial multiplier cell according to the broadest teachings of the invention. FIG. 7 illustrates the basic concept of using parallel shift registers to load and temporarily store the partial product and carry bits from each bit serial multiplier cell after the Nth clock cycle for an N bit multiplier. These partial product bits and carry bits are then shifted out and combined in a single adder coupled to the end of the shift registers. The output of this final adder is a serial bit stream of the most significant bits of the final product. The least significant bits of the final product are derived from the partial product output of the last bit serial multiplier basic cell in the array.

The bit serial basic cell is shown at 20. This can be any bit serial multiplier with stored carry, but, in the preferred embodiment, this cell uses the Booth algorithm concept for better speed performance. The partial product and carry bits generated in this cell are stored internally in flip flops 26 and 24, respectively, as shown in FIG. 1. The partial product input bit from the next most significant cell is the signal PPRODIN. The multiplicand input bit arrives as the MCANDIN signal. The current multiplier bit arrives as the signal Y0, while the exclusive-NOR of the current multiplier bit, Y0, and the previous multiplier bit, Y1, arrives as the signal Y0 XNY1. The partial product output bit from the basic cell to the next less significant cell is the signal PPROD OUT from the Q output of the flip flop 26. The basic cell 20 implements the truth table of FIG. 4 and has the internal structure illustrated for one cell in FIG. 1.

Two shift registers for the partial product bits and the carry bits are implemented by the addition of two flip flops and two multiplexers for each stage (as used herein "stage" and "cell" mean the same thing, i.e., the circuitry to handle one bit of the multiplicand.) The partial product shift register is comprised of the flip flop 28 and the multiplexer 30. The carry shift register is comprised of the flip flop 32 and the multiplexer 34.

The manner in which all these circuits are connected together and function together to multiply two numbers together is best understood by an illustration of the sequence of operation. Initially, the flip flops 24 and 26 in the bit serial multiplier cell 26, hereafter called the basic cell, are cleared. When a multiplication is to be performed, the multiplicand bits are presented in parallel to the basic cells using the MCANDIN signal lines. Each multiplicand bit is presented to the enable circuitry (not shown) like the enable circuits 10 in FIG. 1 for coupling to an input of the full adder (not shown) of the basic cell like the adders 22 in FIG. 1. Whether or not this coupling occurs depends upon the state of the signal Y0XNY1 since this signal by its logic state indicates the Booth algorithm rule to follow depending upon the current multiplier bit and the previous multiplier bit. Control circuitry (not shown) monitors this Y0XNRY1 signal, and, in appropriate circumstances, presents the multiplicand in its two's complement form in bit cycles where the multiplicand must be subtracted from the partial product. Operation of each basic cell on the multiplicand and multiplier bits is as previously explained with reference to FIG. 1. This operation results in the partial product bit for each stage being loaded into the flip flops 26 in each stage, and it results in the carries from each stage, if any, being loaded into the flip flops 24 in each stage.

During the first N clock cycles for an N bit multiplier, the signal STARTM* is in a state such that the flip flops 26 and 24 may be loaded with whatever data is presented at their D inputs. This same logic state also causes the multiplexers 30 and 34 to select their number 1 inputs for coupling to their outputs, i.e., the D inputs of the flip flops 28 and 32. This causes flip flops 28 and 32 to pass PSIN and CSIN to CSOUT and PSOUT at clock edge.

The above described process continues as each new multiplier bit is shifted in and the Booth encoder encodes it with the previous multiplier bit. Each partial product bit from each stage is passed on to the next less significant stage as the signal PPROD OUT. The least significant stage PPROD OUT signal represents the final product least significant bits during the first N clock cycles.

On the N+1th clock cycle, the signal STARTM* changes states such that the flip flops 24 and 26 are cleared, and the multiplexers 30 and 34 switch such that their number 2 inputs are selected for coupling to the D inputs of the shift register flip flops 28 and 32. This loads the flip flops 28 and 32 of each stage with the contents of the partial product and carry flip flops, 26 and 24 respectively, as those contents existed after the Nth clock cycle. This change in states of STARTM* also leaves the flip flops 24 and 26 in each basic cell cleared such that the basic cell is in a state that a new multiplier and a new multiplicand may be processed. During the second N clock cycles, the new multiplicand and the new multiplier are processed as described above. *During these second N clock cycles, the contents of the flip flops 28 and 32 in each stage are shifted toward the least significant stage by one bit position during each clock cycle. That is, during the second N clock cycles, the D inputs of the flip flops 28 and 32 are coupled, respectively, to the signals PSIN and CSIN which are the Q outputs of the corresponding flip flops 28 and 32 in the next higher significance stage (as used herein the "next higher significance stage" and "next lower significance stage" means the stage handling the bit of the multiplicand of the next higher or next lower significance or power of 2). Likewise, the Q outputs of the flip flops 28 and 32 are coupled to the D inputs of the corresponding flip flops 28 and 32 in the next lower significance stage. Thus, on each clock cycle in the second N clock cycles, the partial product bit and the carry bit from each stage in the partial product and carry shift registers are shifted one bit position to the right. The least significant bit position in the partial product and carry shift registers output their bits to a full adder where they are combined to derive the most significant final product bits. PSIN is taken from bit 1 to match the operation of the basic multiplier.

Figure 8:
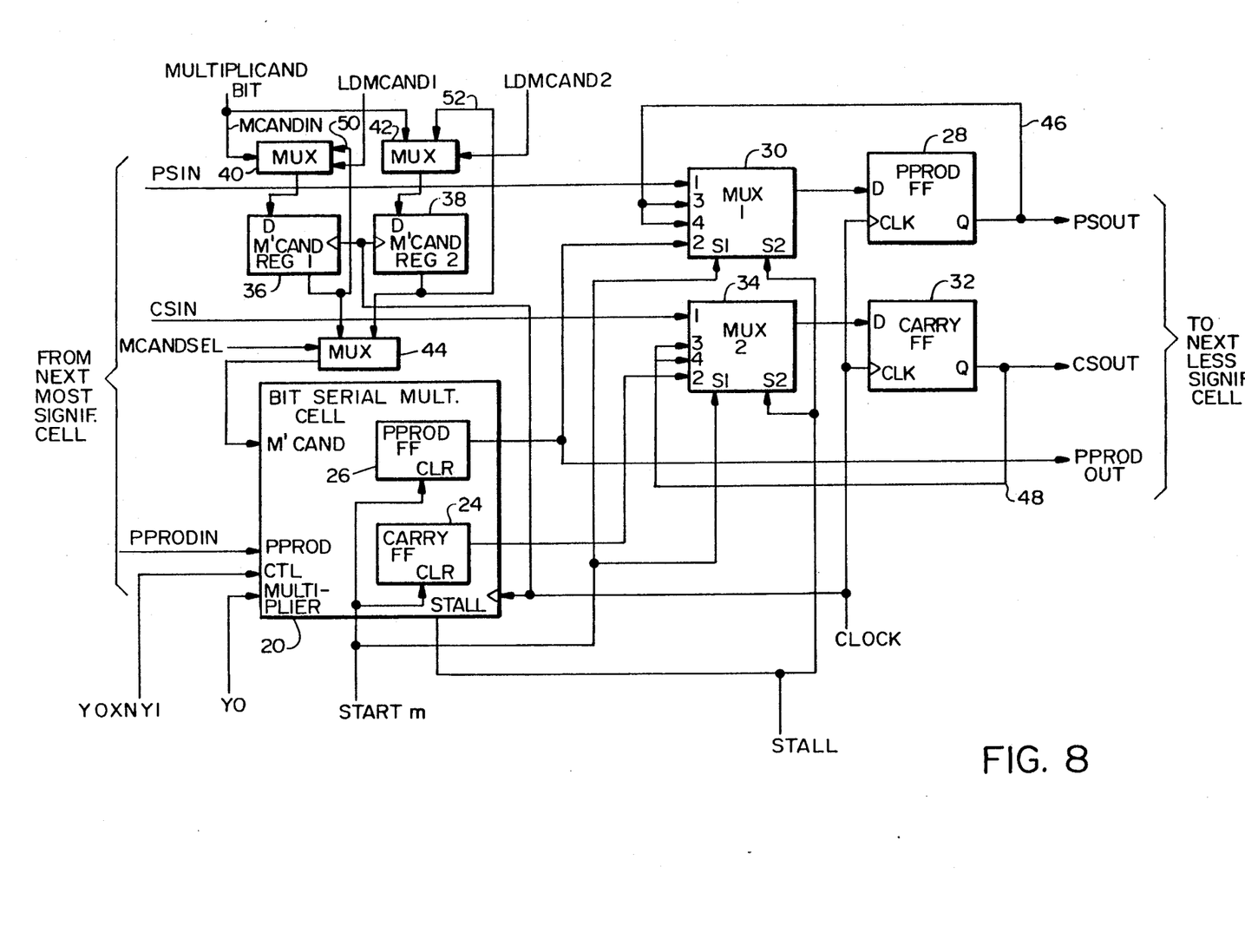
FIG. 8 illustrates another embodiment of a bit serial multiplier according to the teachings of the invention.

Another embodiment of the bit serial multiplier cell of the invention is illustrated in FIG. 8. In this embodiment, two new registers are added with associated multiplexers to hold two different multiplicands. These registers are shown at 36 and 38. These D inputs to these registers are coupled to the MCANDIN signal through multiplexers 40 and 42 which, under the control of the select signals, LDMCAND1 and LDMCAND2, select which of registers 36 or 38 are loaded with the bit represented by MCANDIN at any particular time. The presence of two sets of multiplicand registers allows pipelined operation with prefetch so that as soon as a first multiplicand has been multiplied, a second multiplicand, which has been prefetched during the multiplication of the first multiplicand, is immediately available for processing by the multiplier. The outputs of the two registers 36 and 38 are each coupled through a multiplexer 44 to the multiplicand input of the basic cell 20. The select signal for this multiplexer 44 is the MCANDSEL signal.

The multiplexers 36 and 38 and the multiplexers 30 and 34 each have inputs coupled to the outputs of the registers whose D inputs they control in the embodiment of FIG. 8. In addition there is a STALL select signal coupled to a select input of the multiplexers 30 and 34. Because the multiplier of FIG. 8 is configured to work in a pipelined environment, and because pipeline timing can become out of synchronization when extra data bits must be inserted in the pipeline's data stream, the STALL signal allows upstream stages to be stalled or have their data contents held constant during periods when data bits are being injected into the pipeline data stream. This insures that pipeline timing can be maintained. The STALL signal causes the multiplexers 30 and 34 to select their 3 and 4 inputs thereby coupling the outputs of the flip flops 28 and 30 back into their inputs through lines 46 and 48 and the multiplexers 30 and 34. This holds the contents of flip flops 28 and 32 constant during all clock cycles when STALL is asserted. A similar stall path is present for multiplicand registers 36 and 38 via the lines 50 and 52 and multiplexers 36 and 38. When STALL is asserted, the select signals LDMCAND1 and LDMCAND2 are both in logic states that cause multiplexers 40 and 42 to select the stall paths 50 and 52.

Figure 9:
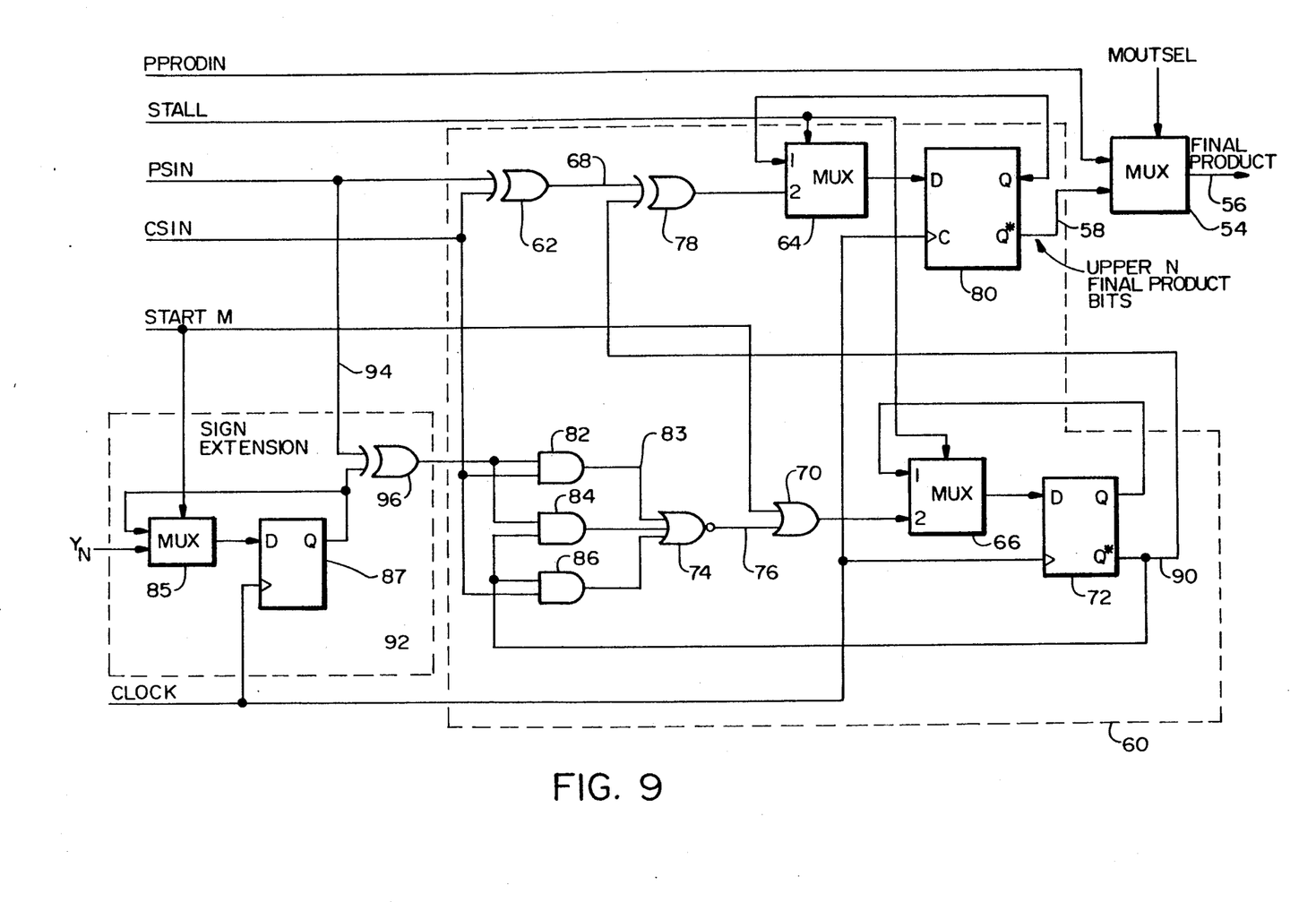
FIG. 9 is a block diagram of the adder which combines the partial products and carry bits from the shift registers.

The adder which combines the partial product and carry bits from the shift registers is shown in FIG. 9. This adder receives as its inputs the partial product output PSOUT from the flip flop 28 of the next to least significant stage and the carry output CSOUT from the flip flop 32 of the least significant stage. PSOUT becomes PSIN at the input of the adder and CSOUT becomes CSIN at the input of the adder. The partial product output signals PPRODOUT from the basic cell flip flop 26 at the least significant bit position becomes the PPRODIN signal at the adder and is one input of an output multiplexer 54. The select signal for this multiplexer is the signal MOUTSEL. For the first N bits of each multiply, this signal can be in a logic state to cause the multiplexer to select the PPRODIN signal for coupling as the FINAL PRODUCT output signal line 56. During the second N clock cycles of each multiply, MOUTSEL can be in a logic state to cause the multiplexer 54 to select its input line 58. This signal line carries the most significant N final product bits, and represents the output of the adder which combines the serial bit stream representing the partial product and carry bits being shifted out of the two shift registers during the second N clock cycles.

In alternative embodiments, all 2N bits could be selected for serial to parallel conversion and parallel output. Basically, in alternative embodiments, the multiplexer 54 could be eliminated an alternative arrangements made to get greater speed of output.

The addition of the partial product and carry bits is implemented by the stored carry adder circuitry 60. This process is started when the signal STARTM* goes to logic 0 at the Nth+1 clock cycle thereby clearing the partial product and carry store flip flops in the basic cell. This logic 0 is clocked into the flip flop 72 which serves as a carry store flip flop for the adder cell 60. The logic 0 must be clocked into the flip flop 72 so that no spurious carry stored there from the last multiply will create an error in the current multiply. When the STARTM* signal goes to logic 0 and the STALL signal is in a logic state to cause the two multiplexers 64 and 66 to be in such a state as to select their number 2 inputs, the logic 0 of STARTM* is clocked into flip flop 72, and the process of combining the partial product and carry bits from the first N clock cycles may begin.

This process of combining the partial product and carry bits arriving during the second N clock cycles (or however many clock cycles are needed to shift in the multiplier bits for the multiplier of the second operation) is performed as follows. Assume that the incoming partial product bit PSIN and the incoming carry bit CSIN are both 0's. A first exclusive-or gate 62 combines the partial product bit PSIN with the carry bit CSIN and outputs a 0 on line 68. A second exclusive-or gate 78 combines the result from the gate 62 with the stored carry in the flip flop 72. In this example, the logic 0 stored in flip flop 72 when STARTM* is asserted becomes a logic 1 at the Q* output (an * means the signal is active low) which is coupled to the exclusive-OR gate 78 thereby passing the signal on the line 68 through the gate 78 and inverting it. This signal is clocked into a flip flop 80 and gets inverted on line 58 coupled to the Q* output. Thus, if PSIN and CSIN are either both zero or both logic 1's, then the output on line 58 will be a logic 0 which is the correct result.

If either PSIN or CSIN is a logic 1 and the other is a logic 0, then the result on line 54 is a logic 1 which is the correct result. This occurs exactly as described above except that the gate 62 now outputs a 1 which is inverted in gate 78 to become a 0 which becomes a logic 1 on line 58 by the inversion in flip flop 80. All three of the above examples assume that no carry was generated in the previous cycle since there was no previous cycle.

Note that the result from the arrival of a partial product and a carry bit does not reach line 58 until one clock cycle after the arrival of the two bits which caused the result. This one clock cycle delay allows any stored carry stored in the flip flop 72 to affect the next two arriving partial product and carry bits.

Sometimes the addition of PSIN and CSIN itself results in a carry. This carry must be added to the result of the next two PSIN and CSIN bits to arrive to generate the correct result for output. This carry propagation is implemented by the AND gates 82, 84, 86 and 88 and the NOR gate 74 coupled via line 76 through OR gate 70 and multiplexer 66 to the carry store flip flop 72. The AND gates generate the carry bits when the PSIN and CSIN bits plus the carry already stored in the flip flop 72 combine to result in a carry. This carry bit is coupled on line 90 to the exclusive-or gate 78 and is combined there with the result of the addition of PSIN and CSIN arriving in the next clock cycle. The end result is the same as if the carry were propagated to the left or next higher significance adder cell. The flip flop 80 provides a suitable one cycle delay so that the effects of the carry "propagation" can effect the proper pair of partial product and carry bits. The carry can result either from the previous pair both being logic 1 or from the previous pair being a 1 and a 0 added to a carry from the cycle previous to the cycle in which the 1 and 0 pair arrived. The AND gate 82 generates the carry on a line 83 when the present pair are both logic 1. The AND gates 84 and 86 generate a carry when the present pair are a 1 and a 0 and flip flop 72 is storing a carry from the previous cycle. The NOR gate 74 combines all these possibilities and the OR gate 70 combines the output of the NOR gate 74 with the STARTM* signal.

Sign extension is handled by the circuitry 92. The purpose of this circuitry is to latch the extended sign bit on the Nth+1 clock cycle. The user must extend the sign bit by one bit when an N bit multiplier is supplied to the machine. That is, if an N bit multiplier is supplied with the Nth bit a logic 1, indicating a negative multiplier, then the user must supply an Nth+1 bit which is also a logic 1. When the STARTM* signal goes low, the multiplexer selects the Yn for coupling to the D input of the flip flop 87. Since this occurs at the Nth+1 clock cycle, the user supplied sign extension bit is latched into and stored in the flip flop 87 during the second N clock cycles. The Q output of the flip flop 87 is coupled to the exclusive-or gate 96 which has its other input coupled to PSIN and its output coupled to one input of the AND gate 82. Thus, if the sign extension bit of the multiplier is a logic 1 indicating a negative number, all the PSIN bits are inverted by gate 96 before they reach the AND gate 82. Those skilled in the art will appreciate the operation of the circuitry of FIG. 9 under the various conditions for carry generation and sign extension.

Figure 10:
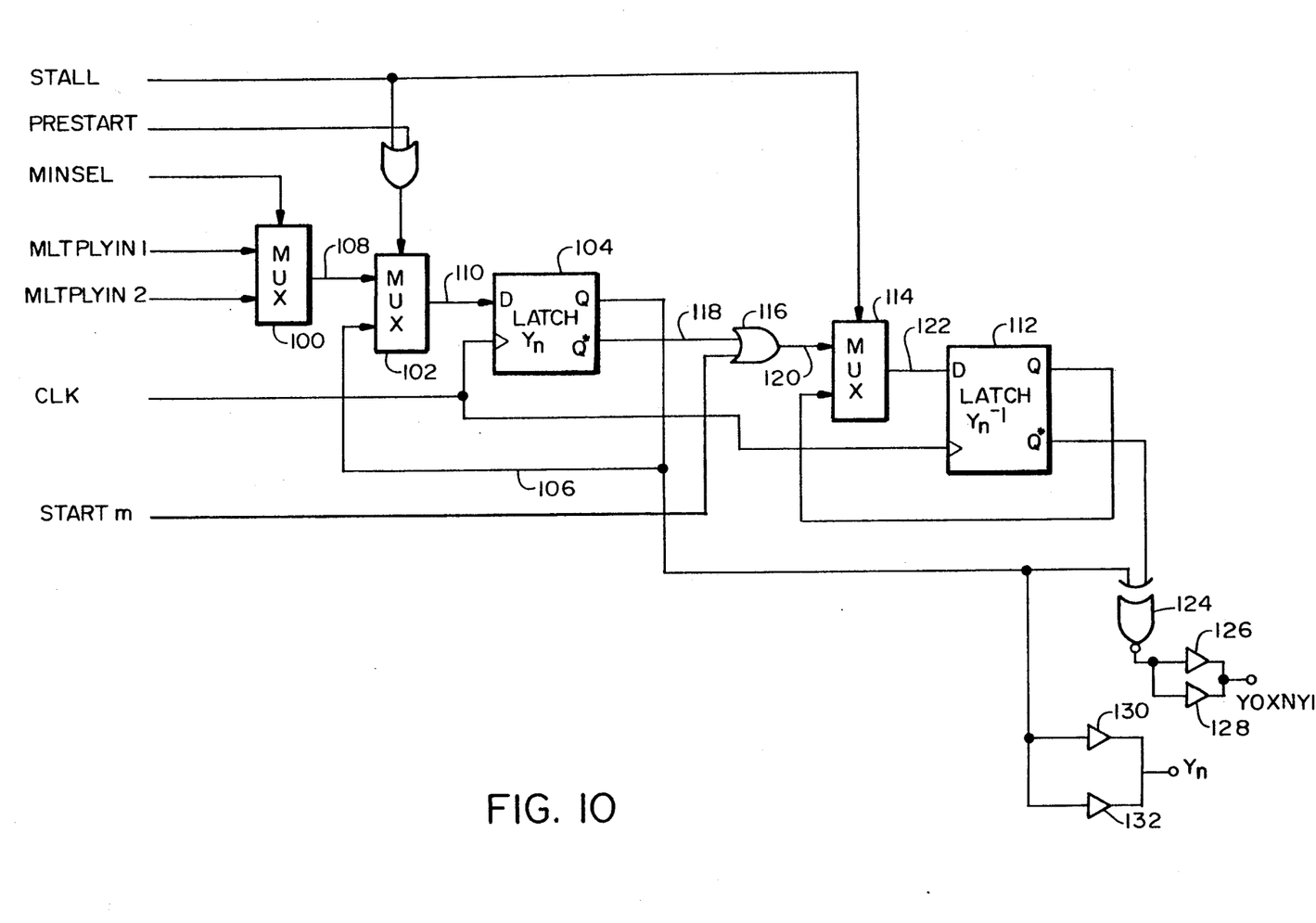
FIG. 10 is a logic diagram of the booth decoder logic that examines the states of the current multiplier bit and the previous multiplier bit to generate the signals which control the implementation of the Booth algorithm.

Referring to FIG. 10 there is shown a logic diagram of the Booth decoder logic that examines the states of the current multiplier bit and the previous multiplier bit and generates the signals which control implementation of the Booth algorithm. A multiplexer 100 allows selection of either of two different multiplier bit streams in the form of signals MLTPLYIN1 and MLTPLYIN2. The signal MINSEL controls selection of which of the two multipliers is selected. This allows prefetch of the multiplier for pipelined operation. The multiplexer 102 has the STALL signal as its select input and allows the contents of a flip flop 104 to be held constant for multiple cycles of the clock signal when STALL is asserted. The PRESTART signal also causes the contents of the flip flop 104 to be held constant while it is asserted. This stalling action is via signal line 106 coupling the Q output back into the D input through the path selected in the multiplexer 102 when the stall action is desired.

The other path through the multiplexer 102 is the multiplier bit stream on lines 108 and 110. The flip flop 104 clocks in and stores one bit of the multiplier on each clock cycle. A second flip flop 112 is coupled to the Q* output of the flip flop 104 through a stall multiplexer 114 and an OR gate 116 via the lines 118, 120 and 122. The purpose of the flip flop 112 is to store the previous multiplier bit $Y_{n-1}$. That is, since flip flop 104 is the first flip flop in a chain of two flip flops that clock in the serial multiplier bit stream, it store the most recently arrived multiplier bit Yn. Since flip flop 112 is second in the chain, it stores the previous multiplier bit.

The OR gate 116 freezes the bit already present in the flip flop 112 upon assertion of the STARTM signal for sign extension thereby disallowing entry of a new bit into the flip flop 112. The Booth algorithm truth table is essentially the function of an exclusive-or gate for whether or not the multiplicand is supposed to be added to the partial product. That is when either Yn or Yn−1 is ol and the other is 0, then the addition occurs (on one case, the addition is of the two's complement of the multiplicand). Otherwise, no arithmetic operation is performed, and only a shift of the partial product is performed. The exclusive-nor gate 124 combines the Q* output of the flip flop 112 together with the Q output of the flip flop 104 to generate a signal YOXNY1 which controls the addition function. This signal plus the Yn signal control the operation of each basic cell in controlling whether the multiplicand or the two's complement of the multiplicand is added to the partial product bits or whether no addition of any kind occurs prior to the shift of the partial product which occurs on every cycle. If YOXNY1 is a 1 and Yn is a 1, then the two's complement of the multiplicand is added. If YOXNY1 is a 1 and Yn is a 0, then the multiplicand is added to the partial product bits. If YOXNY1 is a 0, then no addition occurs. The two's complement is performed inside the basic cell 20 in known manner when necessary.

Since this signal is sent to all of many cells and the clock rate is typically around 32 megahertz, two drivers 126 and 128 are provided to supply the drive to keep the speed of operation high. The Yn bit must also be sent to all of the cells so the drivers 130 and 132 are provided to coupled the Q output of the flip flop 104 to all the cells.

Figure 11:
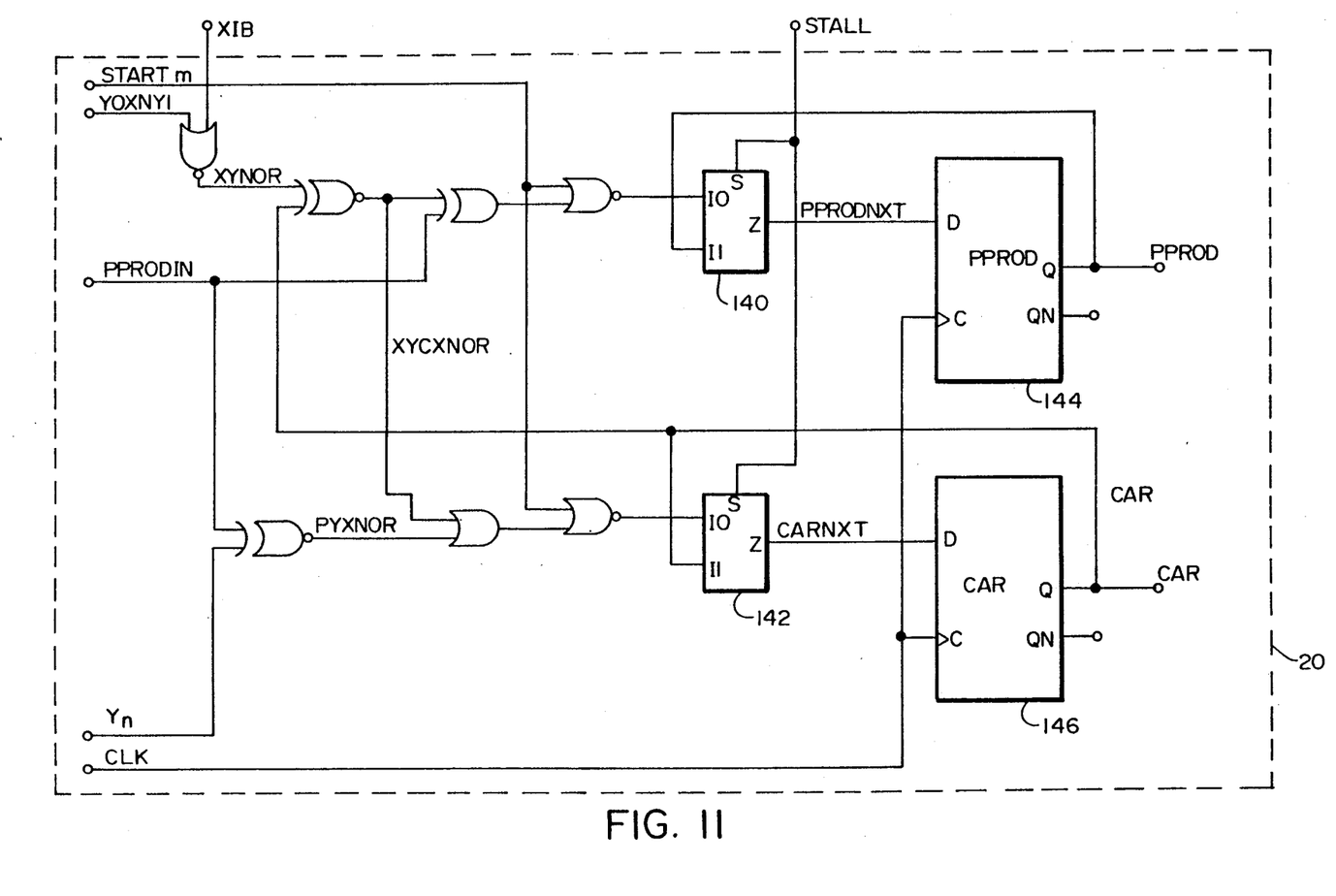
FIG. 11 shows the detailed logic of the particular bit serial Booth algorithm cell with stored carry.

FIG. 11 shows the detailed logic of the particular bit serial Booth algorithm cell 20 with stored carry as used in the embodiments symbolized by FIGS. 78 and 8. The partial product from the next higher significance cell arrives as the signal PPRODIN. The signal YOXNY1 arrives from the circuitry of FIG. 10, and the multiplicand bit for this particular cell arrives as the XIB signal. The STALL signal works with multiplexers 140 and 142 to preserve the contents of the partial product and carry latches, 144 and 146, respectively. The most recent multiplier bit arrives as the signal Yn. The various gates implement the Boolean equations of FIG. 3.

Although the invention has been described in terms of the preferred embodiment disclosed herein, those skilled in the art will appreciate many modifications which may be made without departing from the true spirit and scope of the invention. All such modifications are intended to be included within the scope of the claims appended hereto.

What is claimed is:

1. A bit serial multiplier for pipelined operation comprising:

first means including a plurality of cells and including a plurality of partial product and carry latches for multiplying an N bit multiplier times an M bit multiplicand, where N and M are each any integer, by shifting in the multiplier bits one at a time and multiplying each multiplier bit as said multiplier bit arrives times the multiplicand each bit of which is operated upon in a corresponding cell where each cell generates a partial product bit and a carry bit and stores said partial product and carry bits in corresponding partial product and carry latches for use in the operations on the next multiplier bit to arrive and each cell is coupled to an adjacent cell for shifting out final result bits in serial fashion; and second means for storing all the partial product bits from said partial product latches in a first shift register, and for storing all the carry bits from said carry latches in a second shift register, said partial product and carry bits being so stored after all N bits of the multiplier have been shifted in, and said second means also for clearing said latches storing said partial product bits and said carry bits after all N of the multiplier bits have been shifted in so as to ready said first means to begin another multiplication with a different multiplier and a different multiplicand, and for combining the stored partial product and carry bits to generate the most significant bits of the final product during the clock cycles used to shift the next multiplier into said first means.

2. An apparatus as defined in claim 1 wherein said first means implements Booth's algorithm using a plurality of sequential multiplier bit processing cycles and each cell stores the carry bit generated during the current multiplier bit processing cycle for use in deriving the partial product and carry bits in the same cell during the next multiplier bit processing cycle, and wherein said second means includes a parallel load shift register for the partial product bits and a parallel load shift register for the carry bits, said shift registers shifting out the contents of said shift registers in synchronization with the shifting in of the bits of the n ext multiplier, and further includes a full adder coupled to said shift registers for combining the partial product bits and the carry bits as said partial product bits and carry bits are shifted out of said shift registers to generate the most significant bits of the final product from the first multiplication.

3. A bit serial multiplier including a plurality of coupled cells each of which serially multiplies a multiplicand using each bit of an N bit multiplier in serial fashion one bit at a time in a plurality of bit cycles, where all cells use the same bit of said multiplier during each said bit cycle and continuing one bit of the multiplier at a time until all N bits have been processed where N is any number, each cell operating on a bit of a multibit multiplicand corresponding to the bit position of the cell, each cell generating a partial product bit and a carry bit each of which is stored in a latch in said cell where each said multiplication of an N bit multiplier takes 2N bit cycles, wherein the improvement comprises:

a first shift register means having one stage for each said cell or parallel loading of all the partial product bits stored in the latches in said coupled cells at the end of the first N bit cycles of each multiplication operation and for shifting all the partial product bits so loaded serially out during the second N bit cycles of each multiply operation;

a second shift register means having one stage for each said cell for parallel loading of all the carry bits stored in the latches in said coupled cells at the end of the first N bit cycles of each multiplication and for shifting them out serially during the second N bit cycles of each multiply operation;

clearing means for clearing all the latches in said coupled cells to prepare the coupled cells to begin a multiply operation with a new multiplier and a new multiplicand during the second N clock cycles; and adder means coupled to said first and second shift register means for adding th serially arriving partial product bits and carry bits from the first and second shift registers resulting from said first multiply operation to generate the most significant bits of the final product as a serial bit stream.

4. An apparatus for multiplying a multiplicand by a serially arriving multiplier comprising:

first means for receiving a serial bit stream of first multiplier bits with one bit arriving per clock cycle and for storing the most recently arrived multiplier bit and the next most recently arrived multiplier bit for each said cycle and for encoding said stored multiplier bits in accordance with Booth's algorithm to generate a mathematical operation control signal;

second means having an input coupled to receive a first multiplicand in parallel format and having an input to receive said first multiplier bits in serial format and for multiplying said first multiplicand and said first multiplier together to generate the N least significant bits of the final product using the mathematical operation specified by Booth's algorithm and determined by the two most recently arrived multiplier bits said mathematical operation being encoded in and controlled by said mathematical operation control signal, and including first and second multiplicand storage latches for storing first and second multiplicands so that while said first multiplicand is being processed from said first multiplicand latch using one multiplier bit stream, said second multiplicand latch is available to store said second multiplicand for immediate use when the first multiplicand is no longer being multiplied, and further including means for allowing rapid switching between two different multiplier bit streams, and for generating partial product bits and carry bits in carrying out the bit serial multiplication and for storing said partial product bits and said carry bits in a plurality of latches;

third means coupled to said second means for storing all the partial product and carry bits as stored in said second means at a time just after the last multiplier bit has arrived for the multiplier bit stream currently in use, and for clearing said latches of said second means to prepare said second means for beginning multiplication of a second multiplicand using a second multiplier after all the partial product and carry bits from the first multiplication of said first multiplicand by said first multiplier have been stored in said third means, said third means further including means for combining said partial product bits and said carry bits from said first multiplication to generate the N most significant final product bits from said first multiplication simultaneously with generation of N least significant bits of the final product of the second multiplication by said second means; and means coupled to said second means and to said third means for allowing the contents of the second means partial product latches, carry latches, and said first and second multiplicand storage latches and the partial product and carry bits stored in said contents of the third means to be held constant for any number of clock cycles by the assertion of a stall control signal.

5. A method of multiplying a multiplicand which arrives in parallel format by an N multiplier which arrives as a serial bit stream comprising the steps of:

multiplying all bits of the multiplicand by the N bit multiplier using one bit of the multiplier per clock cycle and using stored carry circuitry to generate a first plurality of final product bits equal to the number of bits in the multiplier, said multiplication occurring during the N clock cycles needed to receive all the multiplier bits and to generate a second plurality of partial product and third plurality of carry bits that, together, define a fourth plurality of final product bits when added together;

storing said second plurality of partial product bits in a plurality of partial product latches and storing said third plurality of carry bits in a plurality of carry latches;

loading said second plurality of partial product bits and said third plurality of carry bits that define fourth plurality of final product bits in first and second shift registers, respectively, at the end of the N clock cycles wherein the N bits of the multiplier are shifted in and clearing the latches from which the partial product and carry bits were loaded;

simultaneously shifting out and adding the partial product bits and carry bits in the correct order to generate a plurality of the most significant final product bits, the number of said final product bits so generated being equal to the number of multiplier bits, said shifting and adding being performed in synchronization with the arrival of the bits of a second multiplier as the second multiplier bits are used to do a second multiplication with a second multiplicand.

6. A method of multiplying a multiplicand by an N bit multiplier comprising the steps of:

multiplying all the bits of the multiplicand by the multiplier using one bit of said multiplier per clock cycle and using Booth's algorithm in stored carry circuitry divided into a plurality of cells each of which uses the same multiplier bit but a different bit of th multiplicand to generate the N least significant final product bits at a serial output during the N clock cycles needed to shift in the N multiplier bits and generating in synchronism with shifting in of said N multiplier bits a plurality of partial product and carry bits at separate parallel outputs that, when properly added together, define the N most significant final product bits and storing these partial product and carry bits in a first plurality of latches;

storing said partial product and carry bits that define the N most significant final product bits in a first and second shift registers, respectively, and clearing the memory in the bit serial multiplier that generated them;

adding the partial product and carry bits stored in said first and second shift registers by shifting them out to the inputs of a full adder to generate the N most significant final product bits at a serial output while simultaneously shifting in the N bits of a second multiplier and using said N bits of said second multiplier to multiply a second multiplicand and generate the N least significant final product bits for the second multiplication.

7. A method of multiplying a multiplicand by an N bit multiplier comprising the steps of:

multiplying all the bits of the multiplicand by the multiplier using one bit of the multiplier per clock cycle in stored carry circuitry to generate the N least significant final product bits during the X clock cycles needed to shift the N multiplier bits in so as to generate the N least significant final product bits, N partial product bits and N carry bits, said N partial product bits and N carry bits together defining the N most significant final product bits when added together, and storing said N partial product bits and N carry bits in one or more memories;

copying said N partial product and N carry bits from said one or more memories to first and second sift registers, respectively, at the end of the first N clock cycles and clearing said one or more memories;

shifting said partial product bits and said carry bits out of said first and second shift registers during the second N clock cycles and adding the partial product bits and carry bits that define said N most significant final product bits as they emerge from said first and second shift registers to generate the n most significant final product bits in an adder coupled to the output of said first and second shift registers while simultaneously shifting in the N bits of a second multiplier and using the bits of said second multiplier to operate upon a second multiplicand in said bit serial multiplier.

8. An apparatus for performing multiplications, comprising;

means for starting and performing a new multiply operation between a N bit multiplier and a M bit multiplicand every N clock cycles and for generating the N least significant final product bits for each said multiplication during the first N clock cycles of that multiplication; and means for calculating the N most significant final product bits from the previous multiplication operation simultaneously with the calculation of the N least significant final product bits of the current multiply operation.

* * * * *